United States Patent
Bhattacharya et al.

(10) Patent No.: US 10,659,218 B2
(45) Date of Patent: *May 19, 2020

(54) SYSTEM AND METHOD FOR DETECTING ANOMALIES IN EXAMINATIONS

(71) Applicant: INTERNATIONAL BUSINESS MACHINES CORPORATION, Armonk, NY (US)

(72) Inventors: Kamal K. Bhattacharya, Nairobi (KE); Jonathan Lenchner, North Salem, NY (US); Charity Wayua, Nairobi (KE); Komminist Weldemariam, Nairobi (KE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/859,520

(22) Filed: Dec. 31, 2017

(65) Prior Publication Data
US 2019/0068360 A1 Feb. 28, 2019

Related U.S. Application Data

(63) Continuation of application No. 15/685,744, filed on Aug. 24, 2017.

(51) Int. Cl.
*H04L 9/00* (2006.01)
*H04L 9/06* (2006.01)
*G06K 17/00* (2006.01)
*G06F 21/62* (2013.01)
*H04L 9/32* (2006.01)
(Continued)

(52) U.S. Cl.
CPC ........ *H04L 9/0637* (2013.01); *G06F 21/6245* (2013.01); *G06F 21/64* (2013.01); *G06K 17/0032* (2013.01); *H04L 9/006* (2013.01); *H04L 9/3239* (2013.01);
(Continued)

(58) Field of Classification Search
USPC .......................................................... 726/26
See application file for complete search history.

(56) References Cited

U.S. PATENT DOCUMENTS 5,775,918 A 7/1998 Yanagida et al.
6,366,760 B1 4/2002 Kucinski et al.
(Continued)

OTHER PUBLICATIONS

Katie Collins, Drones spot cheats taking 'world's most stressful' exam, WIRED UK Jun. 3, 2015, downloaded Sep. 5, 2017 from http://www.wired.co.uk/article/drones-identify-cheats-in-chinese-exams, pp. 1-11.
(Continued)

*Primary Examiner* — Christopher J Brown
(74) *Attorney, Agent, or Firm* — Eyal Gilboa; Otterstedt, Wallace & Kammer, LLP

(57) ABSTRACT

The disclosure provides systems and methods for maintaining integrity of documents and activities associated with examinations. The systems and methods store such activities and documents in a distributed blockchain such that integrity is maintained through transparency and redundancy of the records and activities. The systems monitor for any anomalies and notify appropriate individuals when an anomaly is detected, as well as maintaining a log of such anomalies.

9 Claims, 7 Drawing Sheets

(51) Int. Cl.
*G06F 21/64* (2013.01)
*G06F 16/00* (2019.01)

(52) U.S. Cl.
CPC ............ *H04L 9/3297* (2013.01); *G06F 16/00* (2019.01); *H04L 2209/38* (2013.01)

(56) References Cited

U.S. PATENT DOCUMENTS

| | | | |
|---|---|---|---|
| 6,684,052 B2 | 1/2004 | Kucinski et al. | |
| 7,607,083 B2 | 10/2009 | Gong et al. | |
| 7,711,312 B2 | 5/2010 | Higgins et al. | |
| 8,275,306 B2 | 9/2012 | Attali | |
| 8,312,021 B2 | 11/2012 | Matveeva et al. | |
| 9,813,285 B1 | 11/2017 | McGovern | |
| 2006/0257841 A1* | 11/2006 | Mangano | G09B 3/00 434/354 |
| 2009/0188982 A1 | 7/2009 | Byeon | |
| 2009/0226872 A1 | 9/2009 | Gunther | |
| 2012/0088219 A1 | 4/2012 | Briscoe | |
| 2015/0187219 A1* | 7/2015 | Sheppard | G06T 3/00 434/354 |
| 2018/0260888 A1* | 9/2018 | Paolini-Subramanya | G06Q 40/025 |
| 2018/0322587 A1* | 11/2018 | Linne | H04L 9/3236 |
| 2018/0352033 A1 | 12/2018 | Pacella | |

OTHER PUBLICATIONS

Kamal K. Bhattacharya et al., unpublished U.S. Appl. No. 15/685,744, filed Aug. 24, 2017, System and Method for Detecting Anomalies in Examinations, pp. 1-36 plus 7 sheets of drawings.

Paul J. Otterstedt, List of IBM Patents or Patent Applications Treated as Related, Jun. 28, 2018, pp. 1-2.

* cited by examiner

SYSTEM AND METHOD FOR DETECTING ANOMALIES IN EXAMINATIONS

CROSS-REFERENCE TO RELATED APPLICATIONS

This application is a continuation of U.S. patent application Ser. No. 15/685,744 filed Aug. 24, 2017, the complete disclosure of which is expressly incorporated herein by reference in its entirety for all purposes.

BACKGROUND

In embodiments, the technical field of the invention is methods and systems for processing and validating documents and document trails.

Fairly administering examinations, preventing cheating in examinations, and uniformly marking examinations have been major problems in developing countries around the world. High stake examinations present even more motivation for the stakeholders to work together and used any available technologies to ensure fair examination performance.

Ensuring the credibility of the exam taking and grading process, from when the examination is developed, to when the results are issued, is critical to ensuring fairness to everyone and providing comfort by assuring students that their academic achievements are being fairly measured.

One of the main sources of the cheating is the involvement of multiple parties at different locations (e.g. at marking centers, aggregation centers, distribution centers, etc.) with different interests. For example: exam takers can cheat as they are taking the exam; the examiner can be biased during the marking process; scores and grades can be changed once marking is complete; and flawed algorithms can be used to manipulate scores into final grades that will be communicated.

SUMMARY

Disclosed herein are methods and systems comprising: a device and system to automatically capture exams at different locations; a blockchain system for validating, storing and tracking examination records along with metadata; a means for detecting or determining anomalies (e.g., cheating, dishonest behavior, inconsistencies) of said records, and, based on said anomalies, the system generates and sends alerts; and a means and interfaces for end-users to receive alerts and to verify the validity of final examination scores.

In an aspect is a system and method comprising: a blockchain system for validating, storing and tracking student examination records; a component for detecting or determining anomalies of said records; based on said anomalies, a communications component for sending alerts to designated users; wherein the system is configured for end-users to verify the validity of final examination scores. In embodiments:

the anomalies result from cheating, marking dishonesty, or marking inconsistencies.

designated users are selected from authorities, public representatives, and independent agents;

comprising a device (optical scanner, camera, mobile device, table device, digital pen, etc.) for generating a digital part or full copy of exam record (e.g. completed paper, marked paper, etc.) at a given examination location, and based on which creating historical exam record blockchain from the set of exam record tokens;

transactions in examination process may include: transmitting an electronic copy (e.g., picture or scanned document) the completed paper exam at a location L, transmitting an electronic copy of marked paper, marking a question on exam (e.g., using a digital pen), updating examination marks, aggregating examination marks, computing final grading, verifying final exam scores, etc.

the means for validating may include receiving, by one or more validation devices, an examination marking transaction that includes a set of exam tokens that represent activities (e.g., processing, marking, grading) on exam record performed with respect to a stakeholder (examiner actor, aggregator actor, grading actor, etc.), corresponding one or more chaincodes, wherein: the smart contract (i.e. chaincode) is based on various requisite procedures and requirements related to the execution and management of examination activities or records end-to-end, as outlined by education authority (e.g. Ministry of Education).

further comprising the means for managing and maintaining the consistency between encrypted raw data (e.g. scanned exam images or documents) and exam record historical blockchain.

the means for tracking activities related to examination records may be based on by analyzing the historical exam records (e.g., validity of the metadata information such as location and timestamp, double registration) by obtaining a historical block identifier of the record of the exam record historical blockchain, the corresponding student record historic blockchain, etc.

detecting anomalies (e.g., cheating, inconsistencies) on exam record is based on by using scanned documents (e.g., the scanned/picture documents of marked exam paper) and matching against the historical student exam record blockchain.

detecting anomalies further comprising the use of statistical and learning methods for extracting, characterizing and clustering information from scanned document using advanced OCR (optical character recognition) techniques and computer vision methods (e.g. visual analytics, and deep neural).

the said information may be used by matching algorithms to compare with historic student exam record blockchain to determine the probability of one or more of exam record activities may be related to an anomalous activity (e.g., cheating).

in which the methods and system for anomaly detection may employ intelligent automated grading algorithms (such as the latent semantic analysis, natural language processing, predictive algorithms, and other enabling methods listed in the prior and enabling arts section) to further track, identify/detect likelihood of marking bias and cheatings.

a means for validating grading scores may further use statistical grading methods: distribution functions, normalization functions, context functions, etc.

the detection of anomalies may send alert to one or more designated authorities with audit log information extracted from the student exam record historic blockchain; wherein the system may also provide a means and interfaces for said authorities to further audit logs.

in which our blockchain based system may provide a means and an interface for end-users (e.g. individual user such as students/parents and schools) to query and verify the validity of distributed final grades by using their unique identification tokens (e.g., student UID, school UID, etc.); wherein said end-user query interface may be of any: SMS, USSD, mobile app, IVR interface, web interface, etc.

In an aspect is a method, comprising: maintaining a secure chain of data blocks at a given computing node, wherein the given computing node is part of a set of computing nodes in a distributed network of computing nodes wherein each of the set of computing nodes maintains the secure chain of data blocks, wherein the secure chain of data blocks maintained at each computing node comprises one or more data blocks that respectively represent one or more activities associated with an examination; adding at least one data block to the secure chain of data blocks maintained at the given computing node in response to determining that activity data associated with the at least one data block is valid; wherein the maintaining and adding steps are implemented via at least one processor operatively coupled to a memory associated with the given computing node. In embodiments:

the secure chain of data blocks represents activities of the examination through time;

the adding step further comprises the given computing node: receiving the activity data associated with the examination; determining a validity of the received activity data; computing the at least one data block for the activity data in response to the activity data being validated; and appending the computed data block to the secure chain of data blocks maintained at the given computing node;

validating the received activity data comprises: obtaining a block identifier from the secure chain of data blocks; executing chaincode using a validity requirement; and generating one or more validation outputs based on the executed chaincode;

the one or more validation outputs are utilized in a consensus protocol;

the data block for the activity data is computed in response to the consensus protocol determining that a consensus has been reached; and activity data comprises one or more of: data representing a completed examination; data representing a marked examination; data representing a final marking (i.e., score); data representing an aggregation of final marks.

In an aspect is an apparatus, comprising: at least one processor; and a memory operatively coupled to the processor to form a given computing device that is part of a set of computing nodes in a distributed network of computing nodes wherein each of the set of computing nodes maintains a secure chain of data blocks, the processor and memory configured to: maintain the secure chain of data blocks at the given computing node, wherein the secure chain of data blocks maintained at each computing node comprises one or more data blocks that respectively represent one or more activities associated with an examination; and add at least one data block to the secure chain of data blocks maintained at the given computing node in response to determining that activity data associated with the at least one data block is valid.

In an aspect is a computer program product comprising a processor-readable storage medium having encoded therein executable code of one or more software programs, wherein the one or more software programs when executed by the one or more processors implement steps of: maintaining a secure chain of data blocks at a given computing node, wherein the given computing node is part of a set of computing nodes in a distributed network of computing nodes wherein each of the set of computing nodes maintains the secure chain of data blocks maintained at each computing node comprises one or more data blocks that respectively represent one or more activity associated with an examination; adding at least one data block to the secure chain of data blocks maintained at the given computing node in response to determining that transaction data associated with the at least one data block is valid. In embodiments:

the secure chain of data blocks represents activities of the examination through time; and the blockchain forms a secure chain of data blocks represents a transaction path of the examination record associated with the first party through time.

In an aspect is a system for providing a cryptographic distributed ledger platform for validating examination records, the system comprising: one or more physical computer processors configured by machine-readable instructions to: receive a digitized completed examination, the digitized completed examination representing an immutable record of a completion of an examination by a first party; store the digitized completed examination within a blockchain that provides a verifiable record of examination activities; verify the authenticity of the stored digitized completed examination against a historical record of the examination, and generate an alert if an anomaly is detected; receive a digitized marked examination, the digitized marked examination representing an immutable record of a marking, by a second party, of the completed examination; store the digitized marked examination within the blockchain; verify the authenticity of the stored digitized marked examination against the stored digitized completed examination, and generate an alert if an anomaly is detected; and communicate the alert, when generated, to a user interface, wherein the alert, when generated, comprises content determined in part by the detected anomaly.

In an aspect is a system for providing a cryptographic distributed ledger platform for validating examination records, the system comprising: one or more physical computer processors configured by machine-readable instructions to: receive a digitized completed examination, the digitized completed examination representing an immutable record of a completion of an examination by a first party; store the digitized completed examination onto a blockchain that provides a verifiable record of examination activities; receive a digitized marked examination, the digitized marked examination representing an immutable record of a marking, by a second party, of the completed examination; store the digitized marked examination onto the blockchain; detect an anomaly based on a comparison of the stored digitized marked examination with the stored digitized completed examination; and generate an alert, wherein the alert comprises content determined, at least in part, by the detected anomaly, and wherein the alert further comprises machine readable instructions configured to: alter a user interface associated with the one or more physical computer processors, and alter a setting associated with the one or more physical computer processors so as to limit access to the blockchain. In embodiments:

the machine readable instructions are further configured to cause the one or more physical computer processors to verify the authenticity of the stored digitized completed examination against a historical record of the examination, and generate an alert upon detection of an anomaly;

the machine readable instructions are further configured to cause the one or more physical computer processors to share the alert to a plurality of nodes associated with the blockchain;

storing the digitized completed examination onto the blockchain comprises encrypting the digitized completed examination;

storing the digitized marked examination onto the blockchain comprises encrypting the digitized marked examination;

the digitized completed examination is stored in the blockchain as a part of a first examination activity, the first examination activity being associated with a first examination record;

the examination record may comprise further examination activities, all of which pertain to the digitized completed examination;

the blockchain comprises further examination records, each pertaining to a different completed examination;

the digitized completed examination is stored in the blockchain as a part of a first examination activity; the first examination activity further comprises a first examination activity identifier; the first examination activity identifier comprises a unique party identifier corresponding to the first party and a unique location identifier corresponding to a location of completion of the examination by the first party;

the digitized completed examination is stored in the blockchain as a part of a first examination activity, the first examination activity being associated with a first examination record, and wherein the digitized marked examination is stored in the blockchain as a part of a second examination activity, the second examination activity being associated with the first examination record;

the first examination activity further comprises a first examination activity identifier; the first examination activity identifier comprises a unique party identifier corresponding to the first party and a unique location identifier corresponding to a location of completion of the examination by the first party; the second examination activity further comprises a second examination activity identifier; the second examination activity identifier comprises a unique party identifier corresponding to the second party and a unique location identifier corresponding to a location of marking by the second party of the completed examination;

the one or more physical computer processors is further configured by machine-readable instructions to: extract an overall mark from the digitized marked examination and store the extracted overall mark in the blockchain;

the one or more physical computer processors is further configured by machine-readable instructions to: extract the stored overall mark from the blockchain and verify the authenticity of the extracted overall mark against the stored digitized completed examination, and generate an alert if an anomaly is detected;

the alert, when generated, comprises content determined by the detected anomaly, and is configured to alter a user interface;

further comprising an error detection module configured to detect anomalies in examination activities within the blockchain, wherein the error detection module uses statistical or learning methods for extracting, characterizing and clustering information from scanned examination documents forming, at least in part, the examination activities;

further comprising a verification module configured to verify the authenticity of examination activities based on historical or verified documents; and further comprising a notification module configured to communicate the alert to a designated user based on a detected anomaly.

In an aspect is a method for maintaining a cryptographic distributed ledger for examination records, the method comprising: receiving a digitized completed examination, the digitized completed examination representing an immutable record of a completion of an examination by a first party; storing the digitized completed examination within a blockchain that provides a verifiable record of examination activities; verifying the authenticity of the stored digitized completed examination against a historical record of the examination, and generate an alert if an anomaly is detected; receiving a digitized marked examination, the digitized marked examination representing an immutable record of a marking, by a second party, of the completed examination; storing the digitized marked examination within the blockchain; verifying the authenticity of the stored digitized marked examination against the stored digitized completed examination, and generate an alert if an anomaly is detected; and communicating the alert, when generated, to a user via a user interface, wherein the alert, when generated, comprises a message determined by the detected anomaly. In embodiments:

further comprising electronically delivering the completed examination to the second party for marking;

the storing the digitized completed examination within a blockchain comprising encrypting the digitized completed examination using a public key associated with the first party;

the storing the digitized marked examination within the blockchain comprises encrypting the digitized marked examination using a public key associated with the second party;

the blockchain comprises a plurality of examination records, each examination record comprising a plurality of examination activities and an overall mark, and wherein the method further comprises aggregating a plurality of overall marks from the blockchain to form a report, and communicating the report to a designated user; and the method further comprises determining an overall mark based on the digitized marked examination and storing the overall mark to the blockchain.

In an aspect is a method for maintaining verified examination records, the method comprising: maintaining a secure chain of data blocks at a given computing node, wherein the given computing node is part of a set of computing nodes in a distributed network of computing nodes wherein each of the set of computing nodes maintains the secure chain of data blocks, wherein the secure chain of data blocks maintained at each computing node comprises one or more data blocks that respectively represent one or more activities associated with an examination; adding at least one data block to the secure chain of data blocks maintained at the given computing node in response to determining that examination activity data associated with the at least one data block is valid; generating an alert in response to determining that examination activity data associated with the at least one data block contains an anomaly; wherein the maintaining and adding steps are implemented via at least one processor operatively coupled to a memory associated with the given computing node. In embodiments:

the secure chain of data blocks represents an activity log of the examination through time; and the alert alters a user interface on a user device or a user interface on an output terminal of a server.

These and other aspects of the invention will be apparent to one of skill in the art from the description provided herein, including the examples and claims.

DETAILED DESCRIPTION

Figure 1:
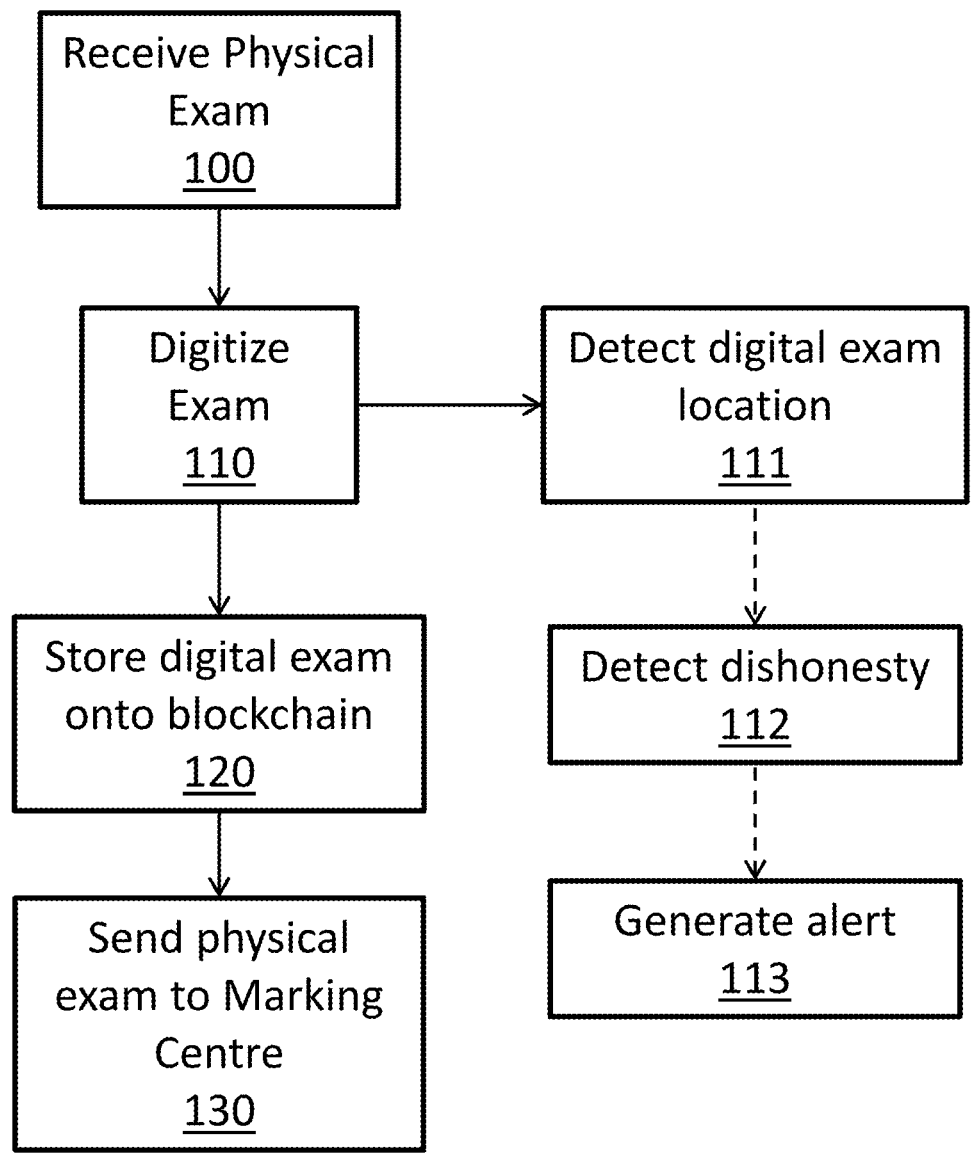
FIG. 1 provides receiving steps in a process of using a blockchain to validate exam processes according to an embodiment of the invention.

In aspects are devices configured to carry out the methods described herein. The devices may comprise a processor and a memory coupled to the processor, the memory configured to store program instructions for instructing the processor to carry out the method. Further details are provided herein. It will be appreciated, however, that certain components of such devices, and further certain steps of the associated methods, may be omitted from this disclosure for the sake of brevity. The omitted components and steps, however, are merely those that are routinely used in the art and would be easily determined and implemented by those of ordinary skill in the art using nothing more than routine experimentation, the general state of the art, and the disclosure herein. Throughout this specification, where hardware is described, it will be assumed that the devices and methods employing such hardware are suitably equipped with necessary software (including any firmware) to ensure that the devices/methods are fit for the described purpose.

Completed paper exams scanning and storing: In embodiments, after completing the exam, each student may authenticate the exam (e.g. through fingerprinting or other biometric authentication, or by signature, or unique assigned ID, or the like), scan their completed exam paper, and deliver the actual completed paper to the examiner at a given location (such location may be referred to herein as "L"). In embodiments the system may transmit the scanned paper along with the necessary metadata information (e.g., timestamp, location information, school information, student information, examiner information, etc.) for storing onto the historical blockchain for the examination.

Marked exam scanning and storing: In embodiments, after completing marking of the completed exam, the person doing the marking (e.g., a lecturer, instructor, teaching assistant, or other individual) may authenticate (as above, e.g. through fingerprinting or other biometric authentication, or by signature, or unique assigned ID, or the like) herself or himself and scan the marked exam paper. The system may then transmit the scanned marked paper along with the necessary metadata information (e.g., location information, timestamp, marking center information, examiner information, student information, etc.) for storing onto the blockchain.

Aggregated marks scanning and storing: In embodiments, each mark (tally score) may be scanned by an official (referred to herein as an "aggregator") and may be transmitted along with the necessary metadata information (e.g., location information, timestamp, aggregation center information, aggregator information, student information, etc.) for storing onto the blockchain. This may occur at the location L or at another location where exams are centrally collected from a variety of locations L.

Uploading final grades: In embodiments, after the final grades have been determined for each student, the grades are transmitted along with the necessary metadata information (e.g., location information, timestamp, aggregation center information, aggregator information, student information, etc.) for storing onto the blockchain.

The methods of validating an activity can include receiving, by one or more validation devices, an examination marking transaction that includes a set of exam tokens that represent activities (e.g., processing, marking, and grading of an exam record of a student) on the exam artifact, performed with/by a stakeholder (examiner actor, aggregator actor, grading actor, etc.).

Systems

In an aspect is a system for providing a cryptographic distributed ledger platform for validating examination records, the system comprising: one or more physical computer processors configured by machine-readable instructions to: receive a digitized completed examination, the digitized completed examination representing an immutable record of a completion of an examination by a first party; store the digitized completed examination within a blockchain that provides a verifiable record of examination activities; verify the authenticity of the stored digitized completed examination against a historical record of the examination, and generate an alert if an anomaly is detected; receive a digitized marked examination, the digitized marked examination representing an immutable record of a marking, by a second party, of the completed examination; store the digitized marked examination within the blockchain; verify the authenticity of the stored digitized marked examination against the stored digitized completed examination, and generate an alert if an anomaly is detected; and communicate the alert, when generated, to a user interface, wherein the alert, when generated, comprises content determined in part by the detected anomaly.

To summarize the data structures within the blockchain, the blockchain comprises examination records. Each examination record corresponds to a single examination and may contain one or more examination activities. Each examination activity may comprise an activity identifier and a payload, wherein the activity identifier provides information about the activity (e.g., an identity of an individual associated with the activity, a location where the activity may have occurred, etc.). The payload provides the actual data for that activity (e.g., the scanned document corresponding to the completed examination, the marked examination, etc.).

In embodiments, then, the digitized completed examination is stored in the blockchain as a part of a first examination activity. The first examination activity is associated with a first examination record. The examination record may comprise further examination activities (e.g., marking of the completed examination, etc.), all of which pertain to the digitized completed examination. The blockchain will comprise further examination records, each record pertaining to a different completed examination. For example, two students taking the examination will produce two physical documents, and the system then accepts these as scanned versions. Upon acceptance of the two documents, two examination records are present in the blockchain, each examination record comprising one or more examination activities.

In embodiments, the first examination activity corresponds to a completion of the exam by a first party (e.g., a student). The completed examination is digitized (e.g., scanned by an optical scanner) and uploaded to the blockchain to form the payload for the first examination activity. In embodiments, the first examination activity then further comprises a first examination activity identifier, which may be assigned automatically or manually via data entry. The first examination activity identifier comprises a unique party identifier corresponding to the first party and a unique location identifier corresponding to a location of completion of the examination by the first party (also referred to herein as "L"). Other information may be stored in the first examination activity identifier as needed.

As stated herein, in embodiments the digitized completed examination is marked by a second party (e.g., an instructor, assistant, etc.) to form a marked examination. The marked examination, like the completed examination, is then digitized and stored in the blockchain. In embodiments, the digitized marked examination is stored in the blockchain as a part of a second examination activity (associated with the same examination record as the first examination activity). The second examination activity further comprises a second examination activity identifier, and the second examination activity identifier comprises a unique party identifier corresponding to the second party and a unique location identifier corresponding to a location of marking by the second party of the completed examination. Further information about the second examination activity is provided herein.

After marking of the examination (or after marking of multiple examinations that form the various examination records of the blockchain), the system is configured for extraction (or receipt) and aggregation of total/final marks for the examination. For example the scan of the marked examination may include automatic detection of a marking score (e.g., a tally written on the exam by the second party). Alternatively (or as a verification) an operator or the second party or another party can manually input the final mark into the system. The system adds the final mark to the blockchain. The final mark may be added to the blockchain as a third examination activity or in any other convenient manner. Thus in embodiments the one or more physical computer processors is further configured by machine-readable instructions to extract the stored overall mark from the blockchain and verify the authenticity of the extracted overall mark against the stored digitized completed examination.

In embodiments, the system validates marking scores further using statistical grading methods: distribution functions, normalization functions, context functions, etc.

In embodiments, the systems herein comprise an error detection module. The error detection module is configured to detect anomalies in examination activities within the blockchain. In embodiments the error detection module uses statistical or learning methods for extracting, characterizing and clustering information from scanned examination documents forming, at least in part, the examination activities.

In embodiments, the error detection module is configured for detecting anomalies (e.g., cheating, inconsistencies, etc.) on exam record based on comparing a scanned documents (e.g., the scanned/picture documents of marked exam paper) against the historical student exam record blockchain. Alternatively or in addition, the error detection module is configured to use statistical and learning methods for extracting, characterizing and clustering information from scanned document using advanced OCR (optical character recognition) techniques and computer vision methods (e.g. visual analytics, and deep neural).

In embodiments, the systems herein comprise a verification module. The verification module is configured to verify the authenticity of examination activities based on historical or verified documents. Such historical or verified documents may be stored in a database accessible to the system. Alternatively or in addition, the documents may be input (e.g., scanned) specifically based on the exam that is the subject of the blockchain. Such documents may be encrypted or otherwise safeguarded against tampering.

In embodiments, the verification module is configured to receive, by one or more validation devices, an examination marking transaction that includes a set of exam tokens that represent activities (e.g., processing, marking, grading) on an examination record performed with respect to a stakeholder (examiner actor, aggregator actor, grading actor, etc.), corresponding to one or more chaincodes (wherein: the smart contract (i.e. chaincode) is based on various requisite procedures and requirements related to the execution and management of examination activities or records end-to-end, as outlined by education authority (e.g. Ministry of Education)).

In embodiments, the systems herein comprise a notification module. The notification module is configured to communicate an alert to a designated user based on a detected anomaly. More about the alert is provided herein elsewhere.

In an aspect is a system for validating, storing and tracking examination activities comprising: a blockchain configured to store a plurality of examination records, each examination record storing one or more examination activities; an error detection module configured to detect anomalies (e.g., resulting from cheating, marking dishonesty, or marking inconsistencies) in the examination records; a notification module configured to transmit an alert to a designated user based on a detected anomaly; (e.g., authorities, public representatives, independent agents); and a verification module configured to verify a validity of an examination record from the plurality of examination records.

In some embodiments the system further comprises a device (e.g., optical scanner, camera, mobile device, table device, digital pen, etc.) for generating a digital copy (in full or in part) of an examination record (e.g. completed paper, marked paper, etc.) or a part thereof.

In embodiments, the system further comprises a module configured to manage and maintain the consistency between encrypted raw data (e.g. scanned exam images or documents) and exam record historical blockchain. The module may use any preferred algorithm for such activities.

In embodiments, the system is configured for tracking activities related to an examination record from the plurality of examination records, the tracking based on analyzing a historical exam records (e.g., validity of the metadata information such as location and timestamp, double registration) by obtaining a historical block identifier of the exam record historical blockchain (or the corresponding student record historic blockchain, etc.).

In embodiments, matching algorithms may be used to compare examination activities (i.e., information obtained or stored within the blockchain specific to a first party such as a student taking an exam) against historic data stored in the blockchain to determine the probability of one or more of exam record activities may be related to an anomalous activity (e.g., cheating during marking).

In an aspect is a system for validating and maintaining a secure chain of data blocks at a given computing node, wherein the given computing node is part of a set of computing nodes in a distributed network of computing nodes wherein each of the set of computing nodes maintains the secure chain of data blocks, wherein the secure chain of data blocks maintained at each computing node comprises one or more data blocks that respectively represent one or more transactions associated with an examination record.

In an aspect is a system comprising a processor, a memory coupled to the processor and storing machine readable instructions, a communications module coupled to the processor and configured to transmit and receive data to or from a user device, and an output device configured to display data from the blockchain.

The systems described above and herein are configured for carrying out the various methods herein. For example, in an aspect is a method for maintaining a cryptographic distributed ledger for examination records, the method comprising: receiving a digitized completed examination, the digitized completed examination representing an immutable record of a completion of an examination by a first party; storing the digitized completed examination within a blockchain that provides a verifiable record of examination activities; verifying the authenticity of the stored digitized completed examination against a historical record of the examination, and generate an alert if an anomaly is detected; receiving a digitized marked examination, the digitized marked examination representing an immutable record of a marking, by a second party, of the completed examination; storing the digitized marked examination within the blockchain; verifying the authenticity of the stored digitized marked examination against the stored digitized completed examination, and generate an alert if an anomaly is detected; and communicating the alert, when generated, to a user via a user interface, wherein the alert, when generated, comprises a message determined by the detected anomaly.

Also for example, in an aspect is a method for maintaining verified examination records, the method comprising: maintaining a secure chain of data blocks at a given computing node, wherein the given computing node is part of a set of computing nodes in a distributed network of computing nodes wherein each of the set of computing nodes maintains the secure chain of data blocks, wherein the secure chain of data blocks maintained at each computing node comprises one or more data blocks that respectively represent one or more activities associated with an examination; adding at least one data block to the secure chain of data blocks maintained at the given computing node in response to determining that examination activity data associated with the at least one data block is valid; and generating an alert in response to determining that examination activity data associated with the at least one data block contains an anomaly; wherein the maintaining and adding steps are implemented via at least one processor operatively coupled to a memory associated with the given computing node.

In embodiments the method further comprises electronically delivering the completed examination to the second party for marking. The second party may mark the examination as an electronic examination using electronic marking or editing tools, in which case a hard copy of the examination is not made for the marking activity. Alternatively a hard copy may be made, in which case the second party receives the hard copy and proceeds to mark the exam in hard copy, after which the marked examination is scanned and input into the blockchain. Alternatively the second party may receive the actual physical examination as completed by the first party (i.e., not a copy), in which case the second party marks the examination and again the marked examination is scanned into the blockchain.

Storing data/payloads into the blockchain includes encrypting such data/payloads. In embodiments storing the digitized completed examination within a blockchain comprising encrypting the digitized completed examination using a public key associated with the first party. Decrypting the encrypted version of the first information payload (i.e., the digitized completed examination) requires a first private key that corresponds to the first public key. Similarly, storing the digitized marked examination within the blockchain comprises encrypting the digitized marked examination using a public key associated with the second party. Decrypting the encrypted version of the second information payload (i.e., the digitized marked examination) requires a second private key that corresponds to the second public key.

As described herein, the method further involves aggregating marks from a plurality of examination records. A total/overall mark for a single examination in an examination record may be stored in the blockchain and the method further comprises aggregating a plurality of total marks from the blockchain to form a report, and communicating the report to a designated user (e.g., a third party such as an administrator).

Blockchain Structure and Actions

The secure chain of data blocks (i.e., the blockchain) represents an activity log of the examination through time. As is normally the case in blockchain-based methods, a copy of the blockchain is stored on a plurality of devices and is updated via a distributed network.

In embodiments, a block in the blockchain may contain: One or more activities (processing, marking, and grading of an exam record of a student); User information (ID, fingerprint, role, constituency, etc.); Location; Hashed values of scanned document or scanned documents itself; Chaincode; Timestamp; Examination details; Grading scheme; Total mark (and, optionally, subset marks such as marks of different problems, sections, etc. within the examination); and/or Context information (e.g. normalization factors, demographic consideration, etc.). In embodiments, the blockchain and system are configured to aggregate anonymized data from the blockchain, including any of the data just mentioned.

In embodiments, each examination record in the blockchain comprises a number of examination activities, with the first examination activity corresponding to the completion of the examination by a first party and the second examination activity corresponding to the marking of the completed examination by a second party. In such embodiments, the first examination activity comprises a first examination payload that is a scanned or otherwise digitized version of the completed examination, as well as a first examination activity identifier with information about the completion of the examination as described herein. The second examination activity comprises a second examination payload that is a scanned or otherwise digitized version of the marked examination, as well as a second examination activity identifier with information about the marking of the examination. Storing these in the blockchain involve forming hashes of the various payloads and activity identifiers. At each stage of the timeline the systems are configured to verify the authenticity and validity of the payloads and activity identifiers, for example by comparing blockchain records within a single node and/or across different nodes on the network participating in the blockchain.

In embodiments, the first examination activity represents an immutable record of a completion, by a first party, of an examination, and comprises a first examination activity identifier and a first information payload, as described herein. The first examination activity identifier is associated with the first party, the first examination activity identifier providing identification of the completion of the first examination by the first party and stored within the blockchain, the first examination activity being identified based on the first examination activity identifier, the first examination activity identifier including a hash of the first information payload enabling auditing of the completion of the first examination by the first party and stored within the blockchain. In embodiments, the first information payload includes an encrypted version of the examination completed by the first party, the encrypted version of the examination being encrypted with a first public key associated with the first party so that the examination completed by the first party and stored within the blockchain is not publicly accessible via the blockchain.

In embodiments, the second examination activity represents an immutable record of a marking, by a second party, of the first examination completed by the first party, comprises a second examination activity identifier and a second information payload, as described herein. The second examination activity identifier is associated with the second party, provides identification of the marking of the first examination by the second party, and is stored within the blockchain. The second examination activity can be identified based on the second examination activity identifier. In embodiments the second examination activity identifier includes a hash of the second information payload enabling auditing of the marking of the first examination by the first party and stored within the blockchain. The second information payload includes an encrypted version of a marking of the completed examination by the second party, the encrypted version of the marked examination being encrypted with a second public key so that the marked examination completed by the first party and stored within the blockchain is not publicly accessible via the blockchain.

In an aspect, then, is a system for providing a cryptographic distributed ledger platform for validating examination records, the system comprising: one or more physical computer processors configured by machine-readable instructions to: identify a first examination activity stored within a blockchain that provides a verifiable record of examination activities, the first examination activity representing an immutable record of a completion of a first examination by a first party, the first examination activity including a first examination activity identifier and a first information payload; retrieve the first information payload from the first examination activity stored within the blockchain; decrypt the encrypted version of the first examination completed by the first party with a first private key that corresponds to the first public key; facilitate presentation of the decrypted first examination through an electronic display to a second party; receive a second information payload from the second party, the second information payload pertaining to the first examination completed by the first party; encrypt the second information payload with a second public key associated with the second party; and store the second information payload within the first examination activity of the blockchain. In embodiments, the system is further configured to carry out one or more transactions in an examination process on one or more of the examination records in the blockchain, the one or more transactions being selected from: transmitting an electronic copy (e.g., picture or scanned document) the completed paper exam at a location L, transmitting an electronic copy of marked paper, marking a question on exam (e.g., using a digital pen), updating examination marks, aggregating examination marks, computing final grading, and verifying final exam scores.

In embodiments the method comprises any combination of the following steps: retrieve the first information payload from the first examination activity stored within the blockchain; decrypt the encrypted version of the first examination completed by the first party with a first private key that corresponds to the first public key; retrieve the second information payload from the second examination activity stored within the blockchain; decrypt the encrypted version of the marked examination completed by the first party with a second private key that corresponds to the second public key; compare the first information payload with the second information payload; facilitate presentation of the decrypted first examination through an electronic display to a second party; receive a second information payload from the second party, the second information payload pertaining to the first examination completed by the first party; encrypt the second information payload with a second public key associated with the second party; store the second information payload within the first examination activity of the blockchain; and store the second information payload within the first examination activity of the blockchain that forms secure chain of data blocks represents a transaction path of the examination record associated with the first party through time.

In an aspect is a method for carrying out the steps mentioned above, specifically a method for maintaining a cryptographic distributed ledger for examination records, the method comprising: identifying a first examination activity stored within a blockchain that provides a verifiable record of examination activities, the first examination activity representing an immutable record of a completion of a first examination by a first party, the first examination activity including a first examination activity identifier and a first information payload; retrieving the first information payload from the first examination activity stored within the blockchain; decrypting the encrypted version of the first examination completed by the first party with a first private key that corresponds to the first public key; facilitating presentation of the decrypted first examination through an electronic display to a second party; receiving a second information payload from the second party, the second information payload pertaining to the first examination completed by the first party; encrypting the second information payload with a second public key associated with the second party; and storing the second information payload within the first examination activity of the blockchain.

In embodiments, the first examination activity identifier comprises information selected from an identity of the first party, a date of the completion of the first examination by the first party, a location of the completion of the first examination by the first party, and an identification code for the first examination.

In embodiments, the second information payload comprises information selected from an identity of the second party, a date of the receipt of the second information payload by the system from the third party, and a location of the receipt of the second information payload by the system from the third party. The second information payload may also comprise marking information pertaining to the first examination.

In embodiments, the storing the second information payload within the first examination activity of the blockchain comprises forming a hash of the first examination activity identifier at least in part with the second information payload. This is one option for structuring the blockchain—a "horizontal" option. Alternatively, the second information payload is associated with a first examination second activity identifier and the storing the second information payload within the first examination activity of the blockchain comprises forming a hash of the first examination second activity identifier from the second information payload. This is a second option for structuring the blockchain—a "vertical" option.

In embodiments, the system further comprises a storage module for storing the blockchain and a communication module configured to receive, via a distributed network, information pertaining to the first examination activity. A storage module is present in each of the computers/systems involved in maintaining the blockchain.

Anomaly Detection

In embodiments is a method for detection of anomalies (e.g., cheating, inconsistencies, etc.) on exam records uses scanned documents (e.g., the scanned/picture documents of marked exam paper) and matching against the historical exam mark record blockchain.

In embodiments, the one or more physical computer processors is further configured by machine-readable instructions to: detect an anomaly in the first examination activity (either in the payload or identifier), or detect an anomaly in the second examination activity (either in the payload or identifier) and generate an alert based on the detected anomaly. Anomalies include those that result from cheating, marking dishonesty, or inconsistencies. Such anomalies can occur at any stage of the examination process—from initial stages of the student taking the exam, through the marking phase, through the tallying phase, through the aggregating marks phase, and finally the reporting and ultimate storage of results. The invention is designed to minimize risk of such anomalies by maintaining as much of this process within the blockchain as possible or feasible.

In embodiments, the system may use, for example, latent semantic analysis (LSA)—a computational linguistic model that measures the similarity between two pieces of text with the cosine between the two vectors. In embodiments, as described herein, the detection of anomalies triggers an alert generation module; the alert generation module may notify one or more designated authorities with audit log information extracted from the student exam record historic blockchain.

The managing and maintaining of the consistency between encrypted raw data and exam record historic blockchain as described herein may further comprise one or more access control policies for governing the privilege and access rights of the one or more stakeholders, wherein the access control policies are implemented as access control (ACL) chaincode as outlined by an official examination board or education authority (e.g. a Ministry of Education).

The cheating or dishonest behavior detection as described herein may further comprise associating the detected cheating or dishonest behavior event with a location, timestamp, and/or actors involved in the marking process for auditing or other purposes.

In embodiments, the anomaly may be identified as an inconsistency between the scans of a completed examination and a marked examination. For example, such scans may involve determination of text within the scans (e.g., by OCR methods), and the inconsistency may be identified as an unexpected difference in the text of one of the documents. Another inconsistency may be observed between images from the documents, such as where an image is unexpectedly offset in one scan compared with another. Another inconsistency may be observed where text or other data unexpectedly is not present in one scan whereas the text or data is present in another scan (e.g., a marking disappears from an examination at different parts of the blockchain). Other anomalies will be apparent to the skilled artisan and may be identified by the methods/systems herein.

Output

In embodiments, the system further comprising an output module that provides an output (e.g., an alert) configured to alter a graphical user interface of the system (e.g., of an output device associated with a server, or associated with a specific node in the network of computers associated with the blockchain, or associated with each output device for each of the networked computers associated with the blockchain) or to alter a graphical user interface of a user device in communication with the system via a distributed network. In embodiments the output module provides output configured to visually or audibly alert a user upon detection of an anomaly with the blockchain.

In embodiments the output is configured to alter a graphical user interface of the system (i.e., a server or any of the computers on a network involved in the blockchain) or to alter a graphical user interface of a user device in communication with the system via a distributed network.

In embodiments the blockchain based system provides a means and an interface for end-users (e.g. individual user such as students/parents and schools) to query and verify the validity of distributed final grades by using their unique identification tokens (e.g., student UID, school UID, etc.); wherein said end-user query interface may be of any: SMS, USSD, mobile app, IVR interface, web interface, etc.

In embodiments the detection of anomalies automatically causes the system to send an alert to one or more designated authorities with audit log information extracted from the student exam record historic blockchain; wherein the system may also provide a means and interfaces for said authorities to further audit logs.

In embodiments, the detection of an anomaly automatically causes the generation of an alert, wherein the alert is configured to limit access to the blockchain in whole or in part. For example, the alert may be based on an anomaly detected in a specific examination record, and the alert cause the computers/nodes participating in the blockchain to be reconfigured such that access to that specific examination record is blocked by anyone without authorized access (e.g., specific individuals, or anyone with a specific password, etc.). This limitation of access may be implemented at one specific node participating in the blockchain or may be implemented at all nodes participating in the blockchain, based on instructions carried within the alert. The limitation of access can be reversible, e.g., upon determination by an authorized individual that the anomaly is non-significant or in error. In an embodiment, the limitation of access is effectuated via a setting on the node(s) implementing the blockchain. Other methods for implementing such a limitation will be known and applicable to the current invention.

In embodiments the alert alters a user interface on a user device or a user interface on an output terminal of a server. In embodiments, the alert, when generated, comprises content determined by the detected anomaly, and is configured to alter a user interface. In embodiments, generation of output such as alerts is automatic and does not require intervention by human operators.

Various embodiments of the invention are described more fully hereinafter with reference to the accompanying drawings. The invention herein may be embodied in many different forms and should not be construed as limited to the embodiments set forth in the drawings; rather, these embodiments are provided to provide further illustrative non-limiting examples. Arrowheads in the figures are provided merely as examples of directions for the flow of data but are not exhaustive and are not meant to be limiting—i.e., data may flow (where appropriate) in directions that are not shown by arrowheads in the figures. Similar numbers in different figures are meant to refer to similar components.

With reference to FIG. 1, there is provided steps in a process of using a blockchain to validate exam processes according to an embodiment of the invention. Thus, an operator or other user of the system receives (100) a physical examination. The physical examination is then digitized (110), such as via scanning or any other suitable method as described herein. The digitized examination is stored (120) to the blockchain, e.g., in the form of a first examination activity payload as described herein. The location L of the examination is detected (111) from the physical examination or, alternatively, may be manually input by a user. They physical examination is sent (130) to an examination Marking Centre for further processing. In the meantime, the system evaluates the determined/detected/input location L and evaluates whether it is correct and accurate—i.e., attempts to detect dishonest behavior or another anomaly (112). The system generates (113) an alert in the event that an anomaly is detected (as indicated by dashed arrow). The alert is processed and delivered (not shown) to a relevant recipient system or individual.

Figure 2:
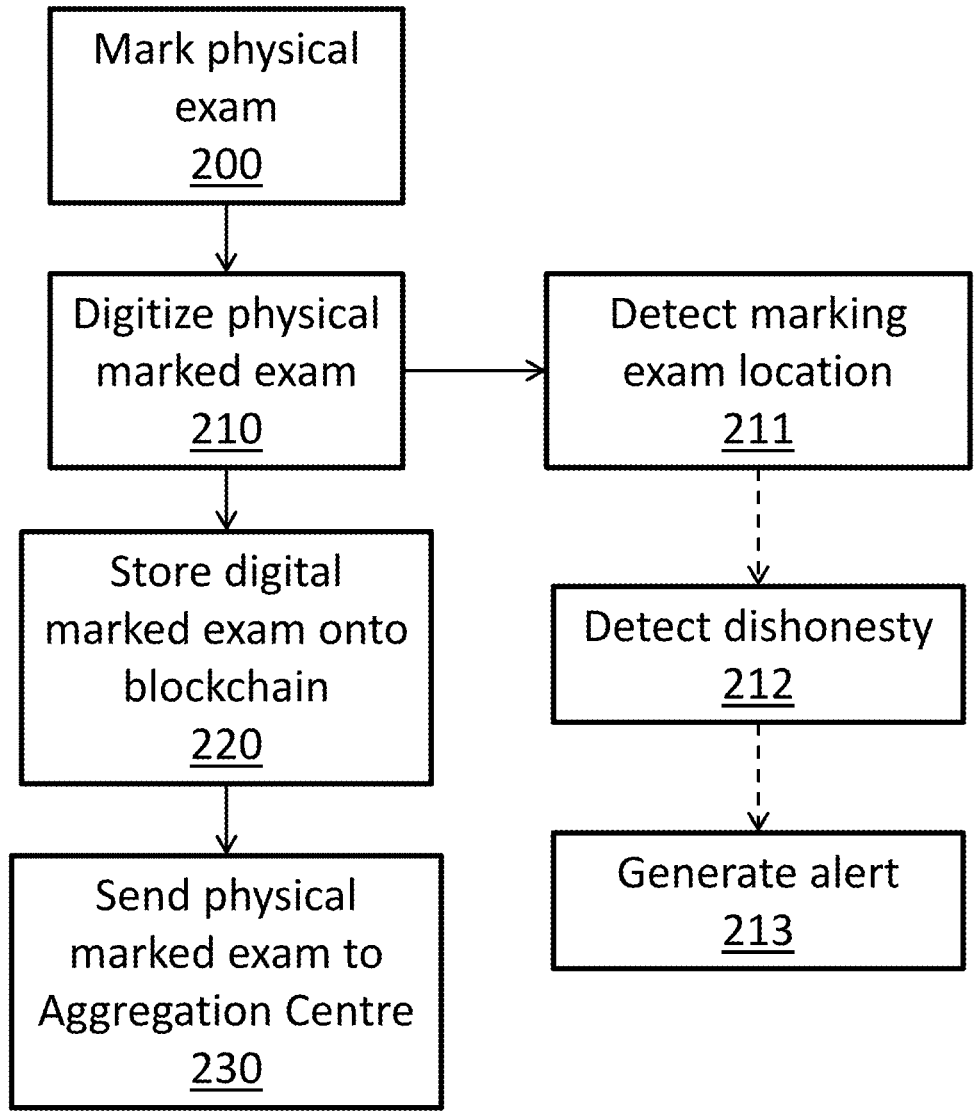
FIG. 2 provides marking steps in a process of using a blockchain to validate exam processes according to an embodiment of the invention.

FIG. 2 provides marking steps in a process of using a blockchain to validate exam processes according to an embodiment of the invention. The physical examination, such as the exam received in FIG. 1, is delivered to a Marking Centre (not shown) and then marked (200) in the marking centre or other location. The physical marked examination is then digitized (210), and the digitized marked examination is stored (220) to the blockchain. Furthermore, the physical location of the marking of the examination is detected (211). The physical marked examination is then sent (230) to the aggregation centre for further processing. In the meantime, the system evaluates the determined/detected/input location of the marking and evaluates whether it is correct and accurate—i.e., to determine whether there is dishonest behavior or another anomaly (212). The system generates (213) an alert in the event that an anomaly is detected. The alert is processed and delivered (not shown) to a relevant recipient system or individual.

Figure 3:
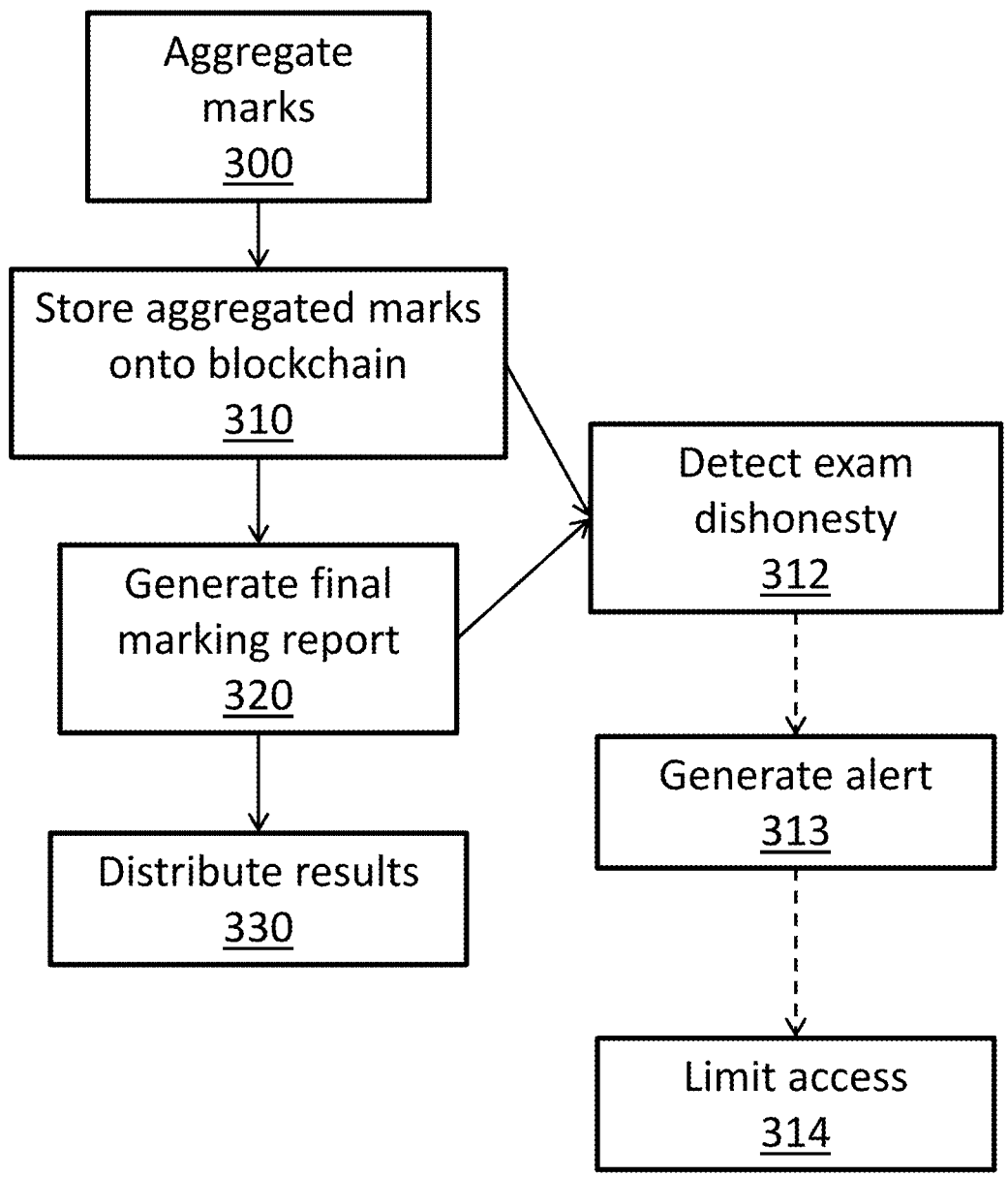
FIG. 3 provides aggregating and reporting steps in a process of using a blockchain to validate exam processes according to an embodiment of the invention.

FIG. 3 provides aggregating and reporting steps in a process of using a blockchain to validate exam processes according to an embodiment of the invention. From a plurality of the physical marked examinations, or from the digitized versions thereof, the system aggregates the final marks (i.e., final scores) 300 of those examinations. The aggregated marks are stored (310) to the blockchain. From the aggregated marks stored in the blockchain, a final marking report (tabulating the final marks for the processed examinations) may be generated (320). At either the aggregation step or the report processing step described above, the system checks for accuracy and correctness of the data, thereby detecting (312) dishonest behavior or other anomalies where present. When an anomaly is found, an alert is generated (313) and delivered (not shown) to a relevant recipient system or individual. The system also, upon generation of an alert, limits access to the blockchain (314), at least until the anomaly is inspected by an authorized user (at which point access can be restored, if appropriate). Results are distributed (330)—these may be the final marking report or any subset or analysis of the report, or may be any individual examination marking obtained/stored in the blockchain.

Figure 4:
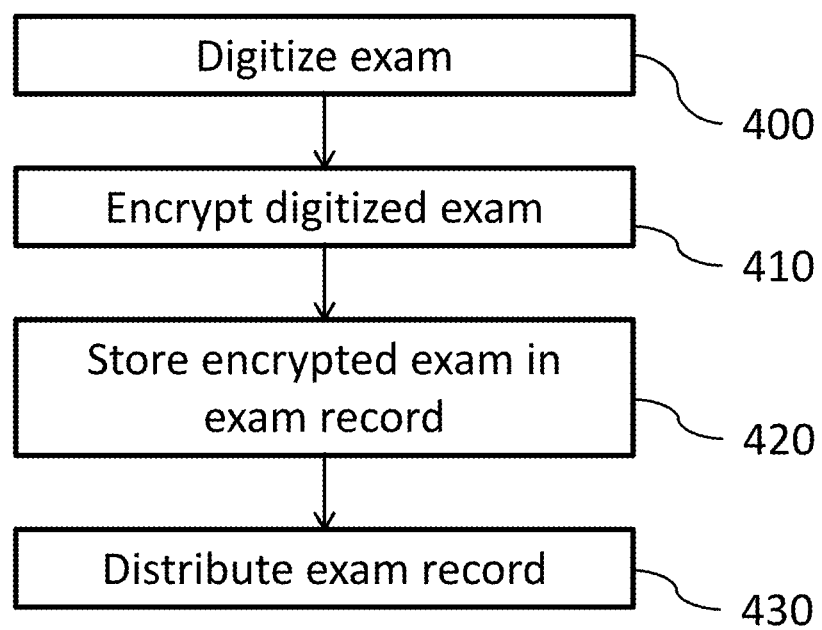
FIG. 4 provides steps in a process for creating and distributing an exam record in a blockchain according to an embodiment of the invention.

FIG. 4 provides steps in a process for creating and distributing an exam record in a blockchain according to an embodiment of the invention. The method thus comprises digitizing a completed examination (400). The digitized examination is encrypted (410) as described herein, and the encrypted data is stored (420) as an examination record in the blockchain. The examination record is then distributed (430) to other nodes in the blockchain to maintain the distributed ledger architecture of the blockchain.

Figure 5:
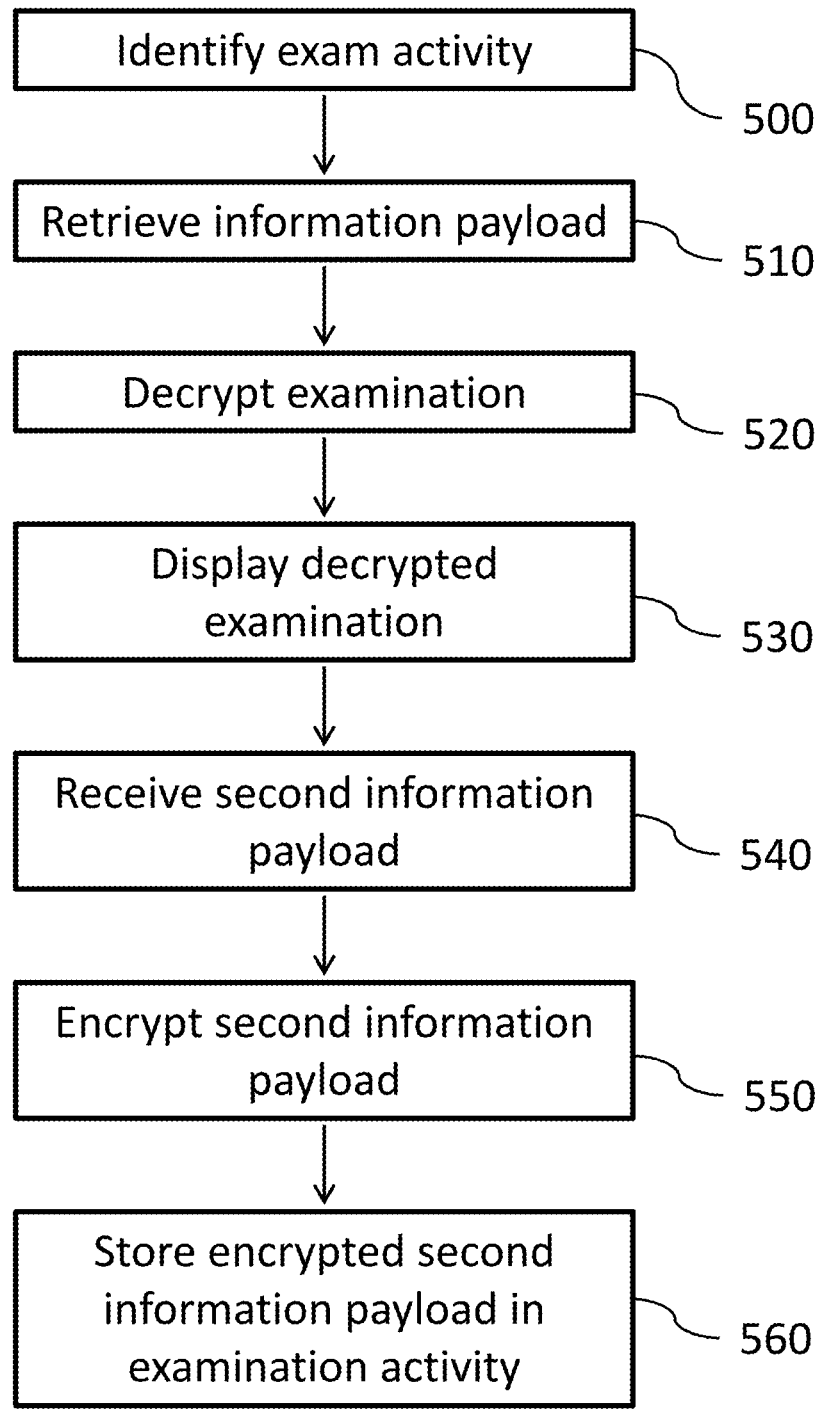
FIG. 5 provides steps in a process for modifying a blockchain after receiving an exam activity according to an embodiment of the invention.

FIG. 5 provides steps in a process for modifying a blockchain after receiving an exam activity according to an embodiment of the invention. The method thus comprises identifying an examination activity (500) within the blockchain. The information payload from the identified examination activity is retrieved (510) from the blockchain. In the case shown the payload is a completed examination. The payload is then decrypted (520), e.g., using a first public key corresponding to the first party, and the decrypted examination may be displayed (530) such as on a user interface. As an alternative (not shown), the decrypted examination may be converted to hard copy. The display of the decrypted completed examination allows a second party an opportunity to mark the examination (not shown in the figure). After the marking of the examination, the system receives (540) a second information payload, such as a scan of the marked examination. It will be appreciated that the above-described steps may alternatively be replaced by physical delivery of a completed examination to a second party, marking by the second party of the physical examination, and then scanning of the marked examination as the second information payload. The second information payload is encrypted (550) as described herein, and then the encrypted second information payload is stored (560) to the blockchain as an examination activity.

Figure 6:
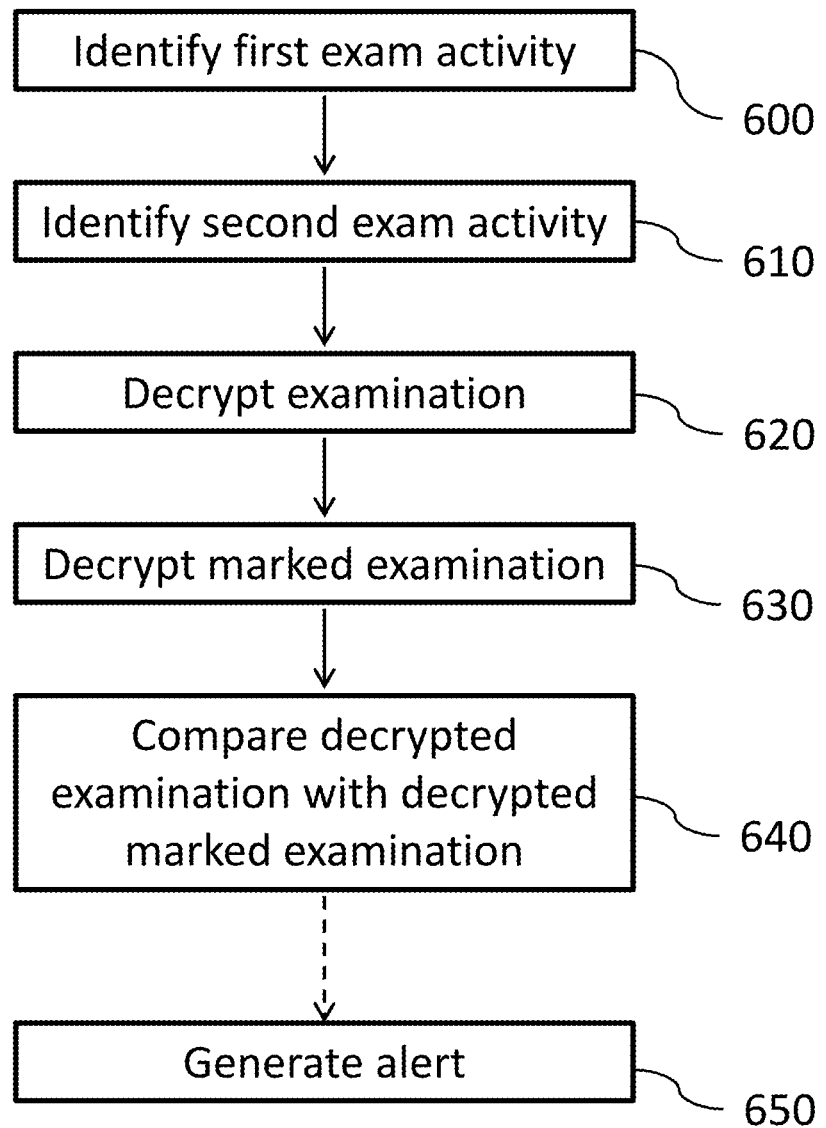
FIG. 6 provides steps in a process for detecting an anomaly in a blockchain according to an embodiment of the invention.

FIG. 6 provides steps in a process for detecting an anomaly in a blockchain according to an embodiment of the invention. In the method, a first examination activity is identified (600) in the blockchain. A second examination activity is also identified (610) in the blockchain. The completed examination (which is part of the first examination activity) is decrypted, and the marked examination (which is part of the second examination activity) is decrypted using appropriate keys. The decrypted data are digitally compared (640) to determine whether there are any anomalies in the data (e.g., alterations of the completed examination, etc.), and any detected anomaly causes the system to generate an alert (650). The generated alert is delivered to the appropriate location or individual.

Figure 7:
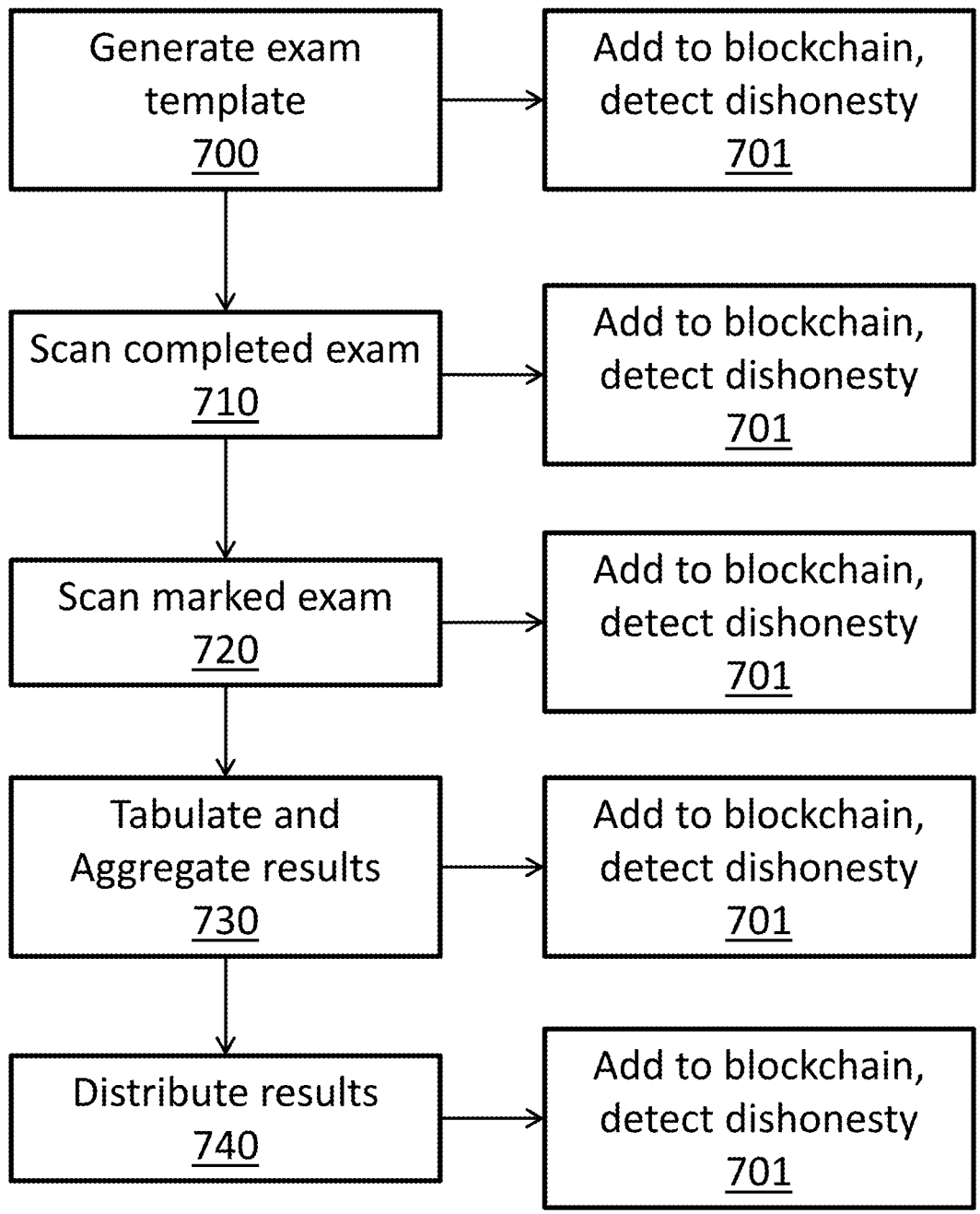
FIG. 7 provides stages at which items are added to the blockchain, and dishonest behavior may be detected, according to an embodiment of the invention.

FIG. 7 provides stages at which items are added to the blockchain, and dishonest behavior may be detected, according to an embodiment of the invention. In the method, an original examination template (e.g., an un-completed examination to be taken by one or more students) is generated (700) and stored to the blockchain, with any suitable dishonest behavior detection steps. (701). The template serves as a baseline for later activities. The examination template is administered to a first party, wherein the first party completes the examination and the completed examination is scanned (710) to create a digital record of the completed examination. The scan is then added to the blockchain, and the system checks for any dishonest behavior or another anomaly in the scanned document (701). Later, the marked digitized examination is scanned (720), and then added to the blockchain and subjected to a check (701) for dishonest behavior or other anomalies. Results from one or more marked examination can be aggregated and tabulated (730) from the blockchain, and the resulting data can be subjected to a check (701) for dishonest behavior or other anomalies. Finally, results are distributed (740) across the blockchain as well as to various recipients at various locations. These results are checked (701) for dishonest behavior or other anomalies as they are distributed.

Throughout this disclosure, the term "system" may refer to a plurality of networked computer nodes, with each node involved in storing and managing the blockchain as is commonly carried out with blockchain methods. The system may or may not comprise a central server configured to manage the operations of the system. The system will include any protocols and components necessary to carry out the methods herein, including communications and storage of data. Throughout this disclosure, use of the term "server" is meant to include any computer system containing a processor and memory, and capable of containing or accessing computer instructions suitable for instructing the processor to carry out any desired steps. The server may be a traditional server, a desktop computer, a laptop, or in some cases and where appropriate, a tablet or mobile phone. The server may also be a virtual server, wherein the processor and memory are cloud-based.

The methods and devices described herein include a memory coupled to the processor. Herein, the memory is a computer-readable non-transitory storage medium or media, which may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Throughout this disclosure, use of the term "or" is inclusive and not exclusive, unless otherwise indicated expressly or by context. Therefore, herein, "A or B" means "A, B, or both," unless expressly indicated otherwise or indicated otherwise by context. Moreover, "and" is both joint and several, unless otherwise indicated expressly or by context. Therefore, herein, "A and B" means "A and B, jointly or severally," unless expressly indicated otherwise or indicated otherwise by context.

It is to be understood that while the invention has been described in conjunction with examples of specific embodiments thereof, that the foregoing description and the examples that follow are intended to illustrate and not limit the scope of the invention. It will be understood by those skilled in the art that various changes may be made and equivalents may be substituted without departing from the scope of the invention, and further that other aspects, advantages and modifications will be apparent to those skilled in the art to which the invention pertains. The pertinent parts of all publications mentioned herein are incorporated by reference. All combinations of the embodiments described herein are intended to be part of the invention, as if such combinations had been laboriously set forth in this disclosure.

What is claimed is:

1. A method for maintaining a cryptographic distributed ledger for examination records, the method comprising:
   receiving a digitized completed examination, the digitized completed examination representing a record of a completion of an examination by a first party;
   storing the digitized completed examination within a blockchain that provides a verifiable and immutable record of examination activities;
   verifying the authenticity of the stored digitized completed examination against an original examination template, and generating an alert in response to detecting an anomaly;
   receiving a digitized marked examination, the digitized marked examination representing a record of a marking, by a second party, of the completed examination;
   storing the digitized marked examination within the blockchain;
   verifying the authenticity of the stored digitized marked examination against the stored digitized completed examination, and generating an alert in response to detecting an anomaly as an inconsistency between the stored digitized marked examination and the stored digitized completed examination; and
   communicating the alert, when generated, to a user via a user interface,
   wherein the alert, when generated, comprises a message determined by the detected anomaly,
   wherein the blockchain is a data structure that stores an original examination template, a first examination activity, and a second examination activity,
   wherein the first examination activity includes the digitized completed examination, a first examination activity identifier, a unique party identifier corresponding to the first party, and a unique location identifier corresponding to a location of completion of the examination by the first party, and the second examination activity includes the digitized marked examination, a second examination activity identifier, a unique party identifier corresponding to the second party, and a unique location identifier corresponding to a location of marking by the second party of the completed examination, and
   wherein the detected anomaly is based on validity of the unique party identifiers and unique location identifiers.

2. The method of claim 1, further comprising electronically delivering the completed examination to the second party for marking.

3. The method of claim 1, wherein the storing the digitized completed examination within a blockchain comprises encrypting the digitized completed examination using a public key associated with the first party.

4. The method of claim 1, wherein the storing the digitized marked examination within the blockchain comprises encrypting the digitized marked examination using a public key associated with the second party.

5. The method of claim 1, wherein the blockchain comprises a plurality of examination records, each examination record comprising a plurality of examination activities and an overall mark, and wherein the method further comprises aggregating a plurality of overall marks from the blockchain to form a report, and communicating the report to a designated user.

6. The method of claim 1, wherein the method further comprises determining an overall mark based on the digitized marked examination using optical character recognition and storing the overall mark onto the blockchain.

7. A method for maintaining verified examination records, the method comprising:
- maintaining a secure chain of data blocks at a given computing node, wherein the given computing node is part of a set of computing nodes in a distributed network of computing nodes wherein each of the set of computing nodes maintains the secure chain of data blocks, wherein the secure chain of data blocks maintained at each computing node comprises one or more data blocks that respectively represent one or more activities associated with an examination;
- adding at least one data block to the secure chain of data blocks maintained at the given computing node in response to determining that examination activity data associated with the at least one data block is valid; and
- generating an alert in response to determining that examination activity data associated with the at least one data block contains an anomaly, wherein the anomaly is detected as an inconsistency between a stored digitized version of an earlier examination activity in an earlier data block and a stored digitized version of a later examination activity in a later data block, wherein the earlier examination activity includes a digitized completed examination, a first examination activity identifier, a unique party identifier corresponding to a first party, and a unique location identifier corresponding to a location of completion of the examination by the first party, and the second examination activity includes a digitized marked examination, a second examination activity identifier, a unique party identifier corresponding to a second party, and a unique location identifier corresponding to a location of marking by the second party of the completed examination, wherein the detected anomaly is based on validity of the unique party identifiers and unique location identifiers;
- wherein the maintaining and adding steps are implemented via at least one processor operatively coupled to a memory associated with the given computing node.

8. The method of claim 7, wherein the secure chain of data blocks represents an activity log of the examination through time.

9. The method of claim 7, wherein the alert alters a user interface on a user device or a user interface on an output terminal of a server.

* * * * *